US007983834B2

(12) United States Patent
Blumendeller

(10) Patent No.: US 7,983,834 B2
(45) Date of Patent: Jul. 19, 2011

(54) METHOD AND DEVICE FOR OPERATING AN INTERNAL COMBUSTION ENGINE

(75) Inventor: Wilhelm Blumendeller, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 449 days.

(21) Appl. No.: 12/220,974

(22) Filed: Jul. 29, 2008

(65) Prior Publication Data

US 2009/0038593 A1 Feb. 12, 2009

(30) Foreign Application Priority Data

Aug. 2, 2007 (DE) ......................... 10 2007 036 258

(51) Int. Cl.
*G06F 19/00* (2006.01)
*G06G 7/70* (2006.01)
*F02M 25/07* (2006.01)
*F02B 47/08* (2006.01)
*F02B 33/44* (2006.01)

(52) U.S. Cl. ................... 701/114; 701/108; 123/568.12; 123/568.16; 60/605.2; 73/114.69; 73/114.74; 165/11.1; 165/52

(58) Field of Classification Search ............. 123/568.12, 123/568.16; 60/605.2; 73/114.69, 114.74; 701/108, 114; 165/11.1
See application file for complete search history.

(56) References Cited

U.S. PATENT DOCUMENTS 4,974,572 A * 12/1990 Aramaki .................... 73/114.74
5,209,212 A * 5/1993 Viess et al. ............... 123/568.16
6,085,732 A * 7/2000 Wang et al. .............. 123/568.12
6,848,434 B2 * 2/2005 Li et al. ..................... 123/568.12
7,222,615 B2 * 5/2007 Buck et al. ............... 123/568.12
2006/0196485 A1 * 9/2006 Kimura ..................... 123/568.16
2009/0101122 A1 * 4/2009 Kurtz et al. .............. 123/568.12
2009/0210129 A1 * 8/2009 Leprieur et al. .............. 701/102
2010/0286960 A1 * 11/2010 Ringeisen ..................... 702/183

FOREIGN PATENT DOCUMENTS

DE 102004041767 3/2006

* cited by examiner

*Primary Examiner* — Willis R Wolfe, Jr.
*Assistant Examiner* — Anthony L Bacon
(74) *Attorney, Agent, or Firm* — Kenyon & Kenyon LLP

(57) ABSTRACT

A method and a device for operating an internal combustion engine having at least one mass flow line and a cooling device for cooling the mass flow in the mass flow line, as well as a bypass, having a bypass valve, that bypasses the cooling device. When the bypass valve is opened, the mass flow is conducted at least partly through the bypass. When the bypass valve is closed, the mass flow is conducted through the cooling device. Downstream from the cooling device and from the bypass in the mass flow line, a temperature of the mass flow in the mass flow line is determined. In at least one operating state of the internal combustion engine, a first temporal temperature gradient is determined with closed bypass valve. In the at least one operating state of the internal combustion engine, a second temporal temperature gradient is determined with closed position of the bypass valve. An error is recognized as a function of a deviation between the first temporal temperature gradient and the second temporal temperature gradient.

11 Claims, 4 Drawing Sheets

METHOD AND DEVICE FOR OPERATING AN INTERNAL COMBUSTION ENGINE

CROSS REFERENCE

This application claims the benefit under 35 U.S.C. §119 of German Patent Application No. 102007036258.9 filed on Aug. 2, 2007, the entirety of which is expressly incorporated herein by reference.

FIELD OF THE INVENTION

The present invention relates to a method and a device for operating an internal combustion engine.

BACKGROUND INFORMATION

German Patent Application No. DE 10 2004 041 767 A1 describes a method and a device for operating an internal combustion engine having an exhaust gas recirculation system that enables a diagnosis of an exhaust gas recirculation cooling device during normal operation of the internal combustion engine. Here, a characteristic quantity for the functioning of the exhaust gas recirculation cooling device is monitored. The characteristic quantity for the function of the exhaust gas recirculation cooling device is determined as a function of a measurement value. The characteristic quantity for the functioning of the exhaust gas recirculation cooling device is prespecified assuming an intact exhaust gas recirculation cooling device. The determined value for the characteristic quantity for the functioning of the exhaust gas recirculation cooling device is compared to the prespecified value. If the determined value of the characteristic quantity for the functioning of the exhaust gas recirculation cooling device deviates from the prespecified value, an error is recognized. In addition, a bypass around the exhaust gas recirculation cooling device is provided with a bypass valve. When the bypass valve is open, the recirculated exhaust gas is conducted at least partly through the bypass. When the bypass valve is closed, the recirculated exhaust gas is conducted through the exhaust gas recirculation cooling device.

SUMMARY

An example method according to the present invention and an example device according to the present invention may have the advantage that a temperature of the mass flow in the mass flow line is determined downstream from the cooling device and from the bypass, in the mass flow line, in at least one operating state of the internal combustion engine a first temporal temperature gradient is determined while the bypass valve is closed, and in the at least one operating state of the internal combustion engine a second temporal temperature gradient is determined while the bypass valve is open, and that an error is recognized as a function of a deviation between the first temporal temperature gradient and the second temporal temperature gradient. In this way, an errored function of the cooling of the mass flow can be reliably and safely recognized through the system made up of the cooling device and the bypass and the bypass valve, even in the case in which the error is caused by a bypass valve that is stuck closed.

An error is particularly easily recognized when the first temporal temperature gradient deviates from the second temporal temperature gradient by not more than a prespecified threshold value.

The error recognition is particularly economical and reliable if a first temperature is determined at a first point in time, with closed or opened bypass valve, and a second temperature is determined at a second point in time, subsequent to the first point in time, with closed or opened bypass valve, and simultaneously or subsequently the bypass valve is opened or, respectively, closed, and, at a third point in time, subsequent to the second point in time, a third temperature is determined with opened or closed bypass valve, and the first temporal temperature gradient is formed as a function of the difference between the first temperature and the second temperature, and the second temporal temperature gradient is formed as a function of the difference between the second temperature and the third temperature. In this way, the error recognition is achieved with a minimum number of determined temperature values.

In addition, it is advantageous if the third point in time is selected at an interval of at least a second prespecified time span from the time of the opening or closing of the bypass valve. In this way, the reliability of the error recognition is increased, and it is avoided that the inertia of the temperature change connected with the opening or closing of the bypass valve will be left out of account in the error recognition.

Another advantage results if the bypass valve is opened or closed within less than a third prespecified time span after the second point in time. In this way, it is ensured that the temperature determined at the second point in time is representative both of the first temporal temperature gradient and of the second temporal temperature gradient.

Another advantage results if the temporal interval between the first point in time and the second point in time is selected to be equal to the temporal interval between the second point in time and the third point in time. In this way, the expense for the determination of the temporal temperature gradients can be reduced, and the comparability of the two temporal temperature gradients, and thus the reliability of the error recognition, can be increased.

Another advantage results if the at least one operating state of the internal combustion engine is selected as a stationary operating state, preferably a idling operating state. In this way, the reliability of the error recognition is increased.

This is all the more the case if in addition the at least one operating state of the internal combustion engine is recognized as present only if a vehicle driven by the internal combustion engine is stationary.

The reliability of the error recognition is further increased in that the at least one operating state of the internal combustion engine is recognized as present only if the mass flow or the mass flow rate exceeds a prespecified threshold value. In this case, it can be sufficiently ensured that the change in the temporal temperature gradient due to the opening of the bypass valve is large enough to be detected.

BRIEF DESCRIPTION OF THE DRAWINGS

An exemplary embodiment of the present invention is shown in the figures, and is explained in detail below.

DETAILED DESCRIPTION OF EXAMPLE EMBODIMENTS

Figure 1:
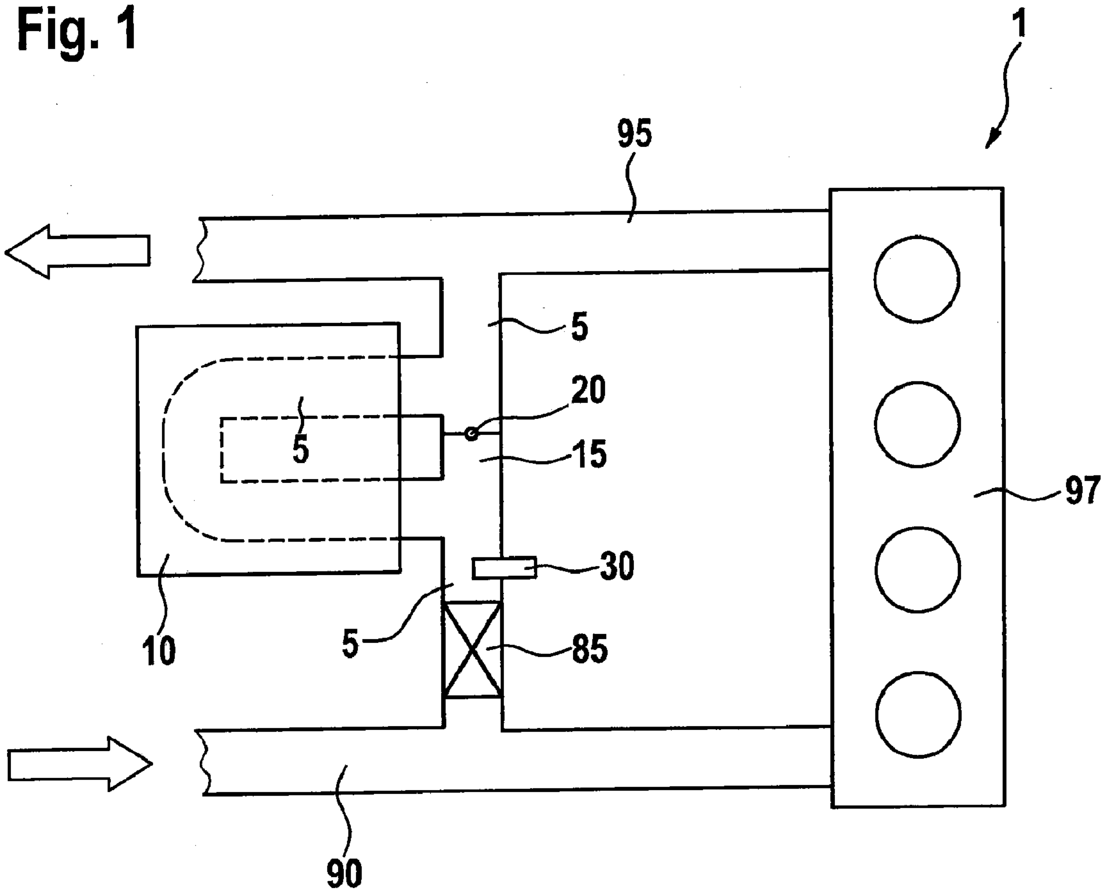
FIG. 1 shows a schematic view of an internal combustion engine.

In FIG. 1, 1 designates an internal combustion engine. Internal combustion engine 1 can be for example a gasoline engine or a diesel engine. An engine block 97 of internal combustion engine 1 is supplied with air via an air supply 90. This air is combusted together with fuel in the combustion chambers of engine block 97. The resulting exhaust gas is expelled into an exhaust-system branch 95. Internal combustion engine 1 can for example drive a vehicle. Via an exhaust gas recirculation line 5, part of the exhaust gas is branched off from exhaust-system branch 95 and supplied to air supply 90. Exhaust gas recirculation line 5 is here routed through a cooling device 10 in order to cool the recirculated exhaust gas. Exhaust gas recirculation line 5, guided through cooling device 10, is bridged by a bypass or bypass channel 15 having a bypass valve 20. When bypass valve 20 is closed, as is shown in FIG. 1, the recirculated exhaust gas flows entirely via exhaust gas recirculation line 5, through cooling device 10. If, on the other hand, bypass valve 20 is open, at least some of the recirculated exhaust gas flows through bypass channel 15, and is therefore not cooled. Downstream from cooling device 10 and from bypass channel 15, in exhaust gas recirculation line 5 there is situated a temperature sensor 30 that measures the temperature downstream from cooling device 10 and from bypass channel 15, in exhaust gas recirculation line 5. Finally, downstream from temperature sensor 30 there is situated in exhaust gas recirculation line 5 an exhaust gas recirculation valve 85, whose degree of opening sets the exhaust gas recirculation rate, and thus the mass flow of the exhaust gas through exhaust gas recirculation line 5, to a desired value, in a manner known to those skilled in the art.

Figure 2:
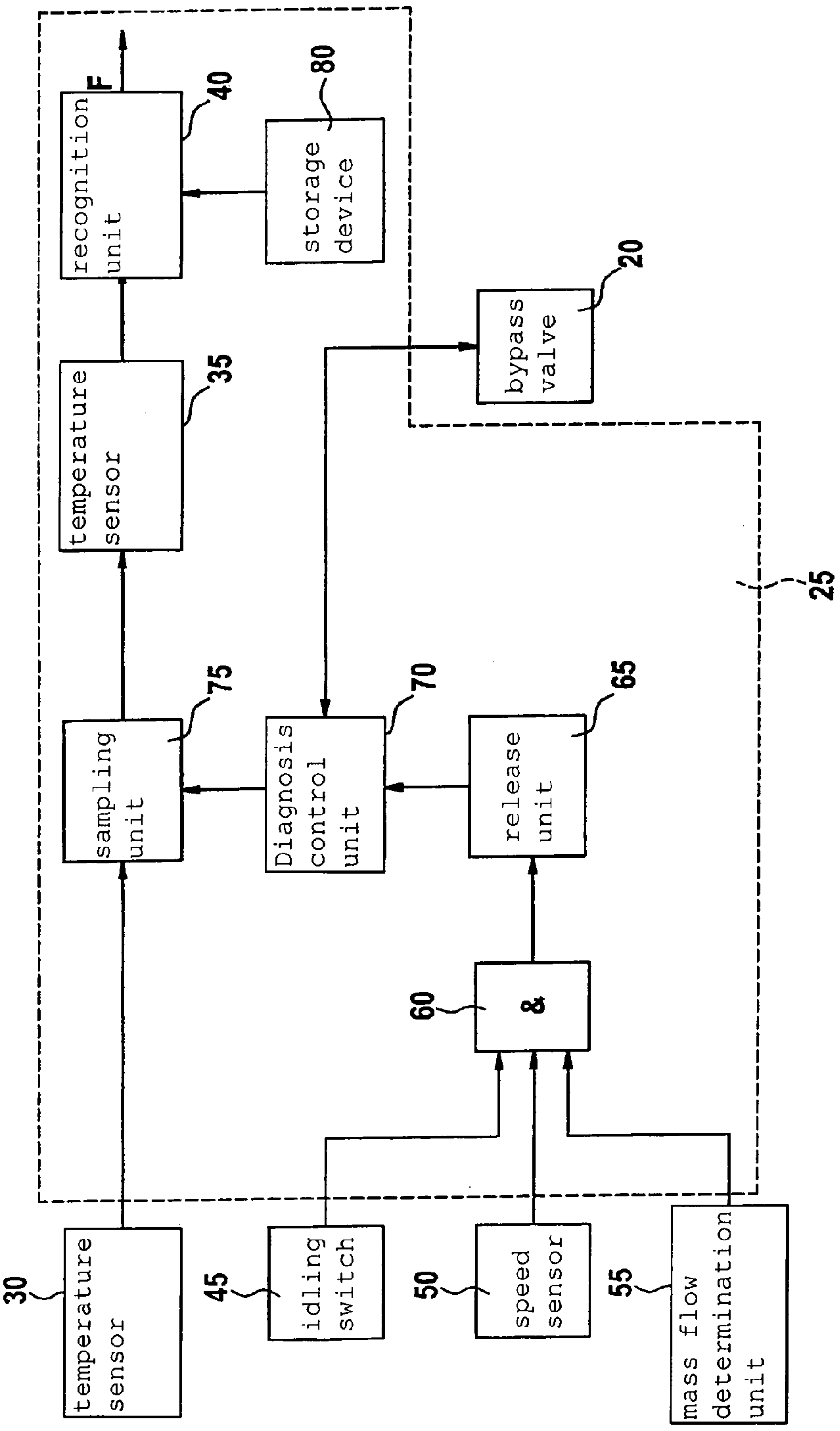
FIG. 2 shows a functional diagram for explaining an example device according to the present invention.

FIG. 2 shows a functional diagram for the explanation of the device according to the present invention. The device according to the present invention can be implemented in an engine control unit of internal combustion engine 1 as software and/or as hardware. In FIG. 2, it has reference character 25. Device 25 is supplied, by a idling switch 45 of internal combustion engine 1, with an item of information about the presence or absence of the idling operating state of the vehicle, driven in this exemplary embodiment by internal combustion engine 1. If the vehicle is in the idling operating state, idling switch 45 outputs a set signal at its output; otherwise, it outputs a reset signal. The signal from idling switch 45 is supplied to an AND element 60 of device 25. AND element 60 is also provided with the signal of a speed sensor 50. Speed sensor 50 acquires the speed of the vehicle and provides at its output a set signal if the speed v of the vehicle is equal to zero; otherwise, speed sensor 50 outputs a reset signal at its output. Finally, a mass flow determination unit 55 is provided that determines the mass flow of the exhaust gas recirculated via exhaust gas recirculation line 5, or determines the exhaust gas recirculation rate, and compares it to a prespecified corresponding threshold. If the mass flow of the recirculated exhaust gas, or the exhaust gas recirculation rate, is higher than the corresponding threshold, mass flow determination unit 5 outputs a set signal; otherwise, it outputs a reset signal. The threshold value for the mass flow, or the exhaust gas recirculation rate, can for example be suitably applied on a test bench in such a way that it is ensured that the opening of bypass valve 20 will create a change in the temporal temperature gradient sufficient for an error recognition. Mass flow determination unit 55 can for example, in a manner known to those skilled in the art, include a mass flow sensor downstream or upstream from cooling device 10 in exhaust gas recirculation line 5. Here, mass flow determination unit 55 can alternatively also model the mass flow through exhaust gas recirculation line 5 from other operating quantities of internal combustion engine 1, in a manner known to those skilled in the art. Temperature sensor 30 is a first determination unit that, in an alternative specific embodiment, can also model the temperature of the recirculated exhaust gas from other operating quantities of internal combustion engine 1 in a conventional manner. Likewise, speed sensor 50 is a speed determination unit that, in an alternative specific embodiment, can model the speed of the vehicle from other operating quantities in a conventional manner. Also, idling switch 45 is a idling operating state recognition unit that, in an alternative specific embodiment, can determine the presence of the idling operating state from operating quantities of the internal combustion engine and/or of the vehicle, or the drive unit, including internal combustion engine 1, of the vehicle. First determination unit 30, idling operating state recognition unit 45, speed determination unit 50, and/or mass flow determination unit 55 may alternatively be situated inside or outside device 25.

AND element 60 outputs at its output a set signal if all three input signals of AND element 60 are set; otherwise, AND element 60 outputs a reset signal at its output. In this way, the output signal of AND element 60 is set if it is the case both that the idling operating state is present and that the vehicle speed is equal to zero and the exhaust gas recirculation rate, or the mass flow in exhaust gas recirculation line 5, is higher than the corresponding threshold value. If the output signal of AND element 60 is set, the diagnosis according to the present invention for error recognition is released; otherwise it is not. For the release, in the simplest case it can be sufficient to recognize the presence of the idling operating state. In this case, the output signal of idling operating state recognition unit 45 can be evaluated directly without requiring AND element 60. Speed determination unit 50 and mass flow determination unit 55 would also not be required for the diagnosis in this case. However, in addition to the idling operating state, the speed of the vehicle and/or the mass flow in exhaust gas recirculation line 5, or the exhaust gas recirculation rate, can also be taken into account in the described manner in order to determine the release condition for the diagnosis. Here, the previously described exemplary embodiment describes the special case in which both the idling operating state and the vehicle speed and the mass flow in exhaust gas recirculation line 5, or the exhaust gas recirculation rate, are evaluated in order to determine the release condition. This ensures a high degree of reliability of the diagnosis.

The output signal of AND element 60 is supplied to a release unit 65. As soon as release unit 65 receives a set signal from AND element 60, it activates a diagnosis control unit 70 of device 25. Diagnosis control unit 70 then reads in, for example via a position sensor (not shown), the position of bypass valve 20, or its degree of opening θ. On the basis of the read-in degree of opening θ, diagnosis control device 70 then checks whether this is greater than zero, i.e., whether bypass valve 20 is not in its closed position and is therefore at least partly open. If this is the case, diagnosis control unit 70 uses a corresponding control signal to cause a closing of bypass valve 20. When bypass valve 20 is closed without error, the recirculated exhaust gas then flows completely via cooling device 10. If no position sensor is present, diagnosis control unit 70 can also derive the current position of bypass valve 20 from the present operating state of internal combustion engine 1. Thus, bypass valve 20 should standardly be opened if internal combustion engine 1 is, for example, in a cold start phase, or if internal combustion engine 1 is in an operating state in which internal combustion engine 1 is warmed up and the cooling of recirculated exhaust gas 5 should be at least partly discontinued in order not to cool internal combustion engine 1. If the diagnosis control unit determines that internal combustion engine 1 is in such an operating state, it assumes that bypass valve 20 is at least partly open, and causes it to close. If, on the other hand, diagnosis control unit 70 determines that an operating situation of the internal combustion engine in which bypass valve 20 should be opened is not present, for example a post-start phase or a full-load operating state in which the maximum possible cooling of recirculated exhaust gas 5 is required, or if diagnosis control unit 70 determines, on the basis of the position sensor that may be present, that bypass valve 20 is closed, no controlling of bypass valve 20 by diagnosis control unit 70 then takes place, or a controlling takes place that is intended to maintain the closed state of bypass valve 20. As soon as diagnosis control unit 70 is able to assume that the closed state of bypass valve 20 has been achieved, possibly after corresponding controlling by diagnosis control unit 70, this unit activates a sampling unit 75 of device 25. For this purpose, it can be provided that for the case in which diagnosis control unit 70 detects a closed bypass valve 20 or an operating situation of internal combustion engine 1 in which a closed bypass valve 20 is expected, diagnosis unit 70 will, immediately upon such detection, activate sampling unit 75. If, on the other hand, a controlling of bypass valve 20 is required in order to bring bypass valve 20 from an open position into a closed position, diagnosis control unit 70 causes the activation of sampling unit 75 at at least a prespecified temporal interval after the closing controlling of bypass valve 20, this prespecified time interval being capable of being suitably applied on a test bench such that on the one hand it is selected as short as possible in order to achieve as fast a diagnosis result as possible, and on the other hand is selected long enough to take into account the delay time of bypass valve 20 from the reception of the control signal until the actual closing of bypass valve 20, and to take into account the inertia of first determination unit 30. With its activation at a first point in time t1, sampling unit 75 samples the temperature signal of first determination unit 30, so that a first temperature value T1 is obtained and is forwarded to a second determination unit 35 of device 25. On the basis of the above, and assuming a bypass valve 20 that is functioning without error, it can then be assumed that bypass valve 20 is closed at first point in time t1. In this way, first temperature value T1 is obtained at an earliest possible point in time (i.e. at first point in time t1) after the authorization of the release through the setting of the output signal of AND element 60. After a first prespecified time span Δt1 from first point in time t1 has elapsed, diagnosis control unit 70 reactivates sampling unit 75 at a second point in time t2, in order to sample a second temperature value T2 from the signal of first determination unit 30. Second temperature value T2 is also forwarded to second determination unit 35. Diagnosis control unit 70 causes bypass valve 20 to open at second point in time t2 at the earliest. After the expiration of a second prespecified time Δt2 from second point in time t2, diagnosis control unit 70 reactivates sampling unit 75 at a third point in time t3 in order to sample the signal of first determination unit 30 in order to obtain a third temperature value T3, and forwards third temperature value T3 to second determination unit 35. Second prespecified time span Δt2 is for example applied on a test bench in such a way that, for a bypass valve 20 functioning without error, it is ensured that bypass valve 20 is open at third point in time t3, preferably for first predetermined time span Δt1. Thus, if the controlling in order to open bypass valve 20 coincides temporally with second point in time t2, second predetermined time span Δt2 can be applied equal to first predetermined time span Δt1. Here, first predetermined time span Δt1 can advantageously be applied, for example on a test bench, such that it is on the one hand as small as possible in order to obtain a diagnosis result as quickly as possible, and is moreover large enough that the delay time from the opening controlling of bypass valve 20 until the actual opening of bypass valve 20 is negligible in relation to first predetermined time span Δt1.

Second determination unit 35 calculates, from received temperature values T1, T2, and T3, a first temporal temperature gradient and a second temporal temperature gradient. First temporal temperature gradient TG1 is calculated as follows:

$$TG1 = \frac{T2 - T1}{\Delta t1}. \quad (1)$$

Second temporal temperature gradient TG2 is calculated as follows:

$$TG2 = \frac{T3 - T2}{\Delta t2}. \quad (2)$$

In addition, second determination unit 35 forms the difference Δ between the two temporal temperature gradients as follows:

$$\Delta = TG2 - TG1 \quad (3).$$

This difference Δ is then forwarded to a recognition unit 40. Recognition unit 40 compares difference Δ to a prespecified threshold value from a threshold value storage device 80. If difference Δ is greater than the threshold value, an error signal F is reset at the output of recognition unit 40, and it is assumed that bypass valve 20 and cooling device 10 are not defective. Otherwise, error signal F is set and an error is recognized. Error signal F is then supplied to a further processing unit (not shown in FIG. 2), which optically and/or acoustically signals the recognized error if error signal F is set. In addition, or alternatively, an error reaction measure can be introduced that results for example in a closing of exhaust gas recirculation valve 85 or, as a last resort, the switching off of internal combustion engine 1. Error signal F can also be supplied to an error counter that is incremented upward in response to each set pulse at the output of recognition unit 40. The error is then not recognized until a prespecified threshold value of the state of the error counter has been reached. Recognition unit 40 and threshold value storage device 80 are also components of device 25, whereas bypass valve 20 is generally not part of device 25. The threshold values stored in threshold value storage device 80 can for example be suitably applied on a test bench in such a way that, on the one hand, tolerances resulting for example from manufacturing do not result in undershooting of the threshold value by difference Δ in the setting of the opening and closed position of bypass valve 20, and thus do not result in an error recognition. For this purpose, the threshold value should thus on the one hand be selected small enough. On the other hand, however, it should also be selected large enough for a reliable error recognition.

Figure 3:
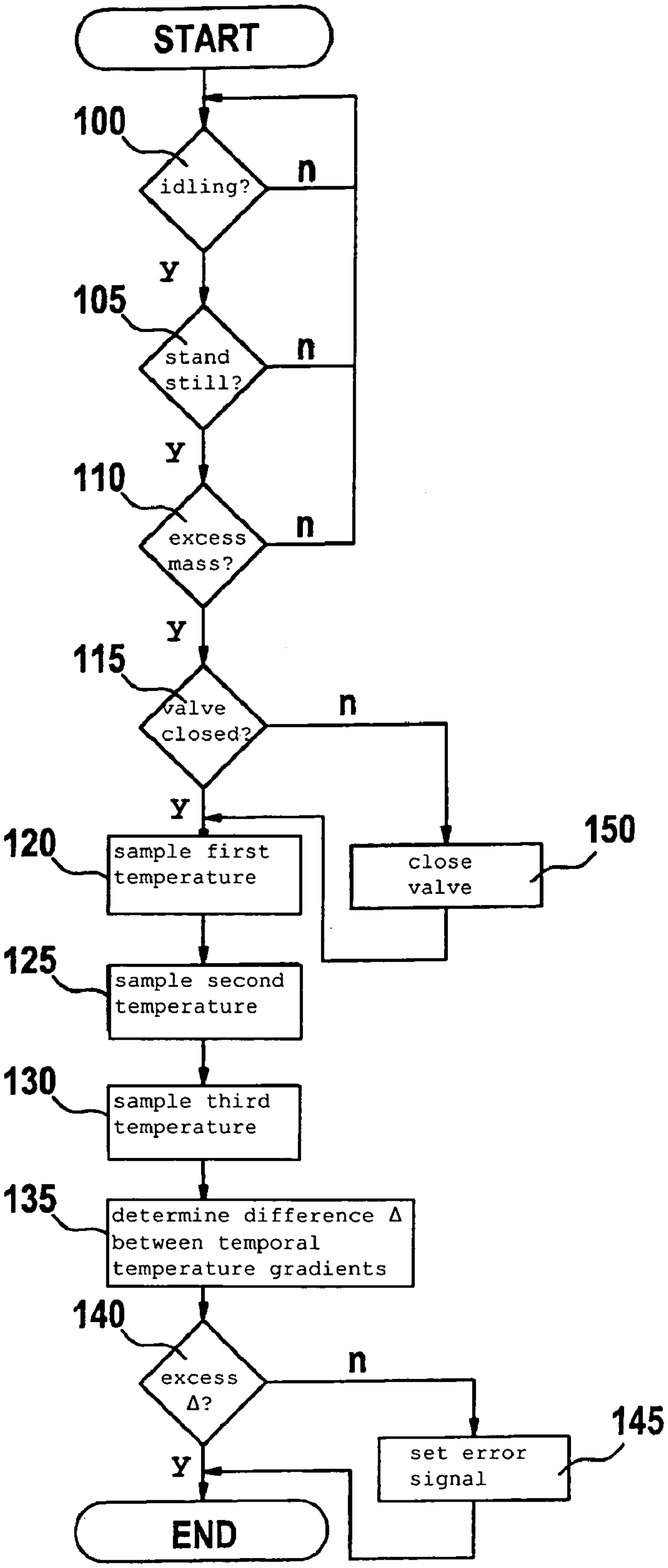
FIG. 3 shows a flow diagram for a sample flow of an example method according to the present invention.

FIG. 3 shows a flow diagram for an exemplary flow of the method according to the present invention. After the start of the program, at a program point 100 AND element 60 checks, on the basis of the signal of idling operating state determination unit 45, whether the idling operating state is present. If this is the case, branching takes place to a program point 105; otherwise, the sequence branches back to program point 100.

At program point 105, AND element 60 checks, on the basis of the signal from speed determining unit 50, whether the vehicle is at a standstill, i.e., whether vehicle speed v is equal to zero. If this is the case, branching takes place to a program point 110; otherwise branching takes place back to program point 100.

At program point 110, AND element 60 checks whether the mass flow in exhaust gas recirculation line 5, or the exhaust gas recirculation rate, exceeds a correspondingly prespecified threshold value. If this is the case, a set signal is outputted by AND element 60, and branching takes place to a program point 115; otherwise, branching takes place back to program point 100.

At program point 115, release unit 65 activates diagnosis control unit 70, which checks in the described manner whether bypass valve 20 is currently closed. If this is the case, branching takes place to a program point 120; otherwise, branching takes place to a program point 150.

At program point 150, diagnosis control unit 70 causes, in the described manner, a closing of bypass valve 20. Branching subsequently takes place to program point 120.

At program point 120, diagnosis control unit 70 activates sampling unit 75 at the earliest possible point after the release is granted and after the recognized (or expected after the controlling) closed state of bypass valve 20 at first point in time t1. Sampling unit 75 thus determines, in the described manner, first temperature value T1 at first point in time t1. Branching subsequently takes place to a program point 125.

At program point 125, diagnosis control unit 70 activates sampling unit 75 in the described manner at second point in time t2 in order to sample second temperature value T2. At second point in time t2, diagnosis control unit 70 also causes an opening of bypass valve 20. Branching subsequently takes place to program point 130.

At program point 130, diagnosis control unit 70 activates, in the described manner, sampling unit 75 at third point in time t3 in order to determine third temperature value T3. Branching subsequently takes place to a program point 135.

At program point 135, second determining unit 35 determines first temporal temperature gradient TG1 and second temporal temperature gradient TG2 and determines difference Δ therefrom in the described manner. Branching subsequently takes place to a program point 140.

At program point 140, recognition unit 40 checks whether difference α exceeds the prespecified threshold value of threshold value storage device 80. If this is the case, error signal F is reset and the program is exited; otherwise, branching takes place to a program point 145.

At program point 145, error signal F is set at the output of recognition unit 40. Subsequently, the program is exited.

Figure 4:
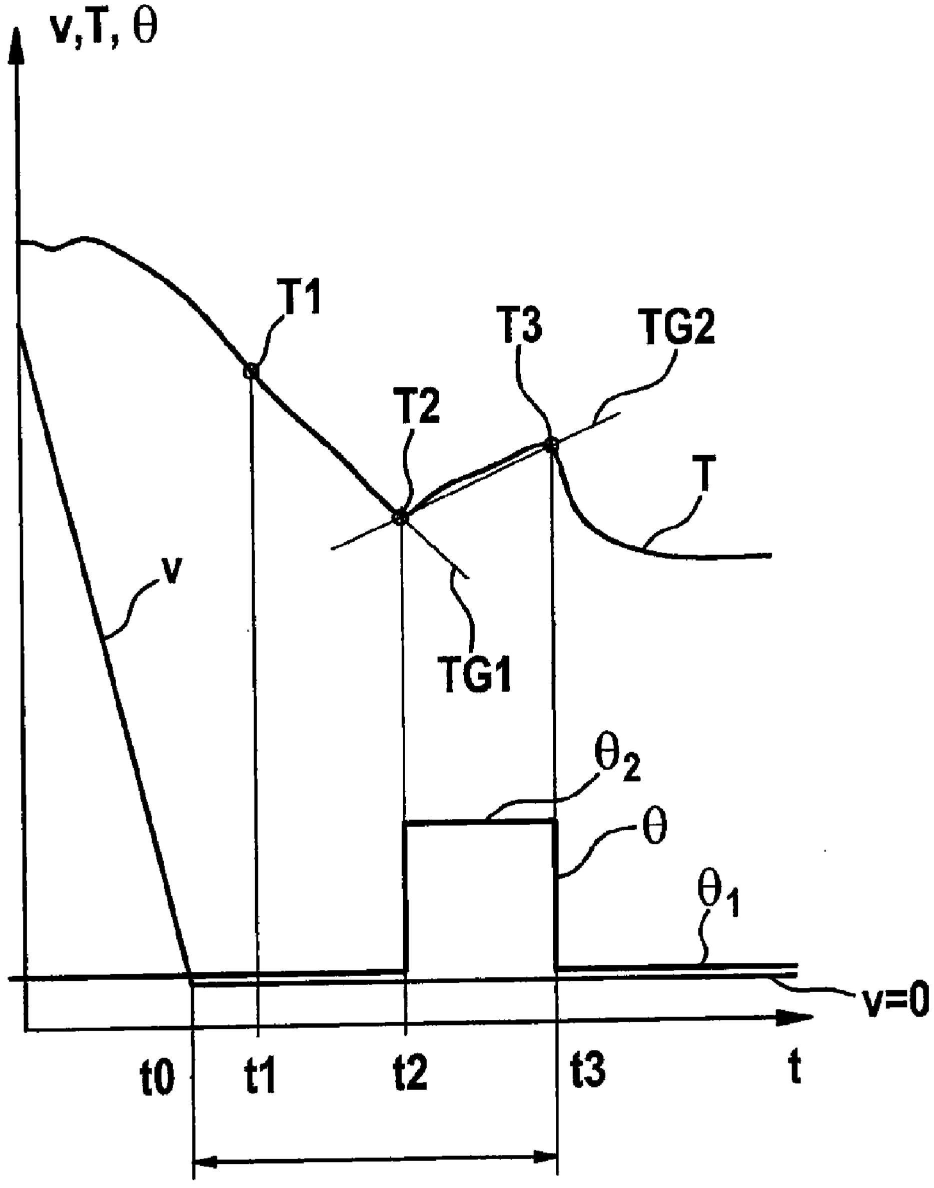
FIG. 4 shows a diagram representing the curve of the vehicle speed, the initial temperature of the cooling device, and the degree of opening of the bypass valve over time.

FIG. 4 shows an example of a curve of speed v of the vehicle, of temperature T of the recirculated exhaust gas downstream from cooling device 10, and of bypass 15, as well as of the degree of opening θ of bypass valve 20 over time t. Here, vehicle speed v falls to zero by time t0. Under the assumption that idling operation results and the mass flow in exhaust gas recirculation line 5, or the exhaust gas recirculation rate, exceeds the corresponding threshold value, the release for the diagnosis, through the setting of the output signal of AND element 60, can then be granted at the earliest at point in time t0. Finally, signal θ over time t represents the controlling of bypass valve 20 by diagnosis control unit 70. Here, bypass valve 20 is first controlled according to a first control value $\theta_1$, in order to assume a closed position in which the recirculated exhaust gas flows completely via cooling device 10. In this way, the maximum cooling effect of the recirculated exhaust gas is achieved, so that temperature T according to FIG. 4 first decreases with time t. Here, given a closed controlling of bypass valve 20 at first point in time t1, first temperature value T1 is determined in the described manner. At the subsequent second point in time t2, second temperature value T2 is then determined. From second point in time t2, bypass valve 20 is controlled, in order to open this valve, with a second control value $\theta_2$ greater than $\theta_1$, with the goal of causing the recirculated exhaust gas to flow at least partly via bypass 15, thus reducing the cooling effect. Therefore, from second point in time t2 this results in an increase in temperature T of the recirculated exhaust gas. Third temperature value T3 is then determined at third point in time t3. Subsequently, diagnosis control unit 70 again controls bypass valve 20 according to first control value $\theta_1$ in order to close bypass valve 20, in order to terminate the diagnosis process. Second determination unit 35 then determines first temporal temperature gradient TG1 and second temporal temperature gradient TG2. Here, first temporal temperature gradient TG1 corresponds to the slope of the straight line through the two temperature values T1 and T2 on temperature curve T, whereas second temporal temperature gradient TG2 corresponds to the slope of the straight line between the two temperature values T2 and T3 on temperature curve T. For the case in which cooling device 10 and bypass valve 20 are operating without error, there then results at second point in time t2, under some circumstances, a change of sign between the two temporal temperature gradients TG1 and TG2. Moreover, given a properly functioning cooling device 10 and bypass valve 20, a sufficiently large angle, corresponding to the prespecified threshold value, must result between the two straight lines shown in FIG. 4 for first temporal temperature gradient TG1 and for second temporal temperature gradient TG2. With the closing of bypass valve 20 as a result of the controlling to first value $\theta_1$ from third point in time t3, temperature T of the recirculated exhaust gas then again decreases from third temperature value T3.

In the case in which Δt1 and Δt2 are each approximately 10 seconds, the elapsed time from time t0 of the release of the diagnosis until third point in time t3, the termination of the diagnosis, is approximately 25 seconds.

The method and device according to the present invention can be applied analogously to arbitrary mass flow lines in the described manner, in which the mass flow line is conducted through a cooling device and the cooling device is bridged by a bypass having a bypass valve. Thus, for example, a cooling device having a bypass and bypass valve in air supply 90 can also be diagnosed in the described manner.

As soon as at least one of the named release conditions is no longer met, AND element 60 outputs at its output a signal that has been reset, and an introduced diagnosis is then terminated, even if third point in time t3 has not yet been reached, so that a diagnosis result has not yet been obtained. In order to obtain the highest degree of reliability of the diagnosis with the most reliable comparability of the two temporal temperature gradients TG1 and TG2, it should be ensured that the bypass valve is opened within less than a third prespecified time span Δt3 after second point in time t2. Taking into account the delay between the opening control signal and the actual opening of bypass valve 20, third prespecified time Δt3 can be suitably applied, for example on a test bench, and can be selected to be at most large enough that the reliability of the error diagnosis is not adversely affected in an undesirable manner. In the ideal case, third prespecified time span Δt3 corresponds to the named delay time.

The threshold value stored in threshold value storage unit 80 can also be applied with respect to the tolerances to be taken into account in such a way that a cooling device 10 operating without error and a bypass valve 20 operating without error result in a difference Δ greater than the threshold value only if prespecified emission boundary values for the exhaust gas are not exceeded.

A defective exhaust gas recirculation cooling system made up of cooling device 10, bypass 15, and bypass valve 20 may cool excessively or too little. A cooling system that cools excessively may do so, for example, because of a bypass valve 20 that is stuck closed, resulting in permanent flow through cooling device 10. During the start phase of internal combustion engine 1, this is disadvantageous because here the engine warms up as quickly as possible and the conversion thresholds for exhaust gas treatment systems that may be present should be reached as quickly as possible.

If a system cools too little, the reason may be that the heat throughput coefficient of the cooling pipe system has been significantly lowered by soot or rust depositions from the exhaust gas, or that the supply of cooling water of the predominantly water-cooled cooling device is interrupted, or that the recirculated exhaust gas is not conducted through cooling device 10 at all because bypass valve 20 is stuck in the open position. In normal operation, these errors results in a change in filling, or in the exhaust gas recirculation rate, thus also resulting in increased pollutant emissions in the exhaust gas. The occurrence of the above-named errors results in the setting of error signal F according to the device and the method according to the present invention. On the basis of the described release conditions, the described method and the described device can be used for diagnosis with great frequency during normal operation of the internal combustion engine. Here, the method according to the present invention can be carried out both in the start phase of the internal combustion engine and also during normal operation, given the presence of the described release conditions. The use of the vehicle speed as an additional release condition for the idling operating state has the advantage that for the case in which the vehicle is recognized to be stationary, the probability that the vehicle will be in idling operation for a longer period of time is greater than when the vehicle is in motion, so that it is ensured with a high degree of probability that the diagnosis will be carried out.

With the use of a temperature sensor as a first determining unit 30, the first prespecified time span Δt1 and the second prespecified time span Δt2 can advantageously be selected as a function of the dynamic range of the temperature sensor; that is, the greater the dynamic range of the temperature sensor, the faster it can reflect a temperature change in its measurement signal, and the smaller the first and second prespecified time spans Δt1 and Δt2 can be selected. The value of 10 seconds for the first prespecified time span Δt1 and for the second prespecified time span Δt2 can be taken as a guideline for standard high-temperature sensors. If the described diagnosis can be carried out completely once during a driving cycle, it can advantageously be provided to block the diagnosis for the rest of the driving cycle in order to disturb the operation of the internal combustion engine as little as possible.

Another advantage of carrying out the diagnosis and the idling operating state while the vehicle is stationary is that the pollutant emissions are relatively low at that time, so that a multiple active opening of bypass valve 20, for example because the release conditions were not present long enough to carry out a complete diagnosis, will not result in any significant additional harmful emissions. In addition, the stationary or idling condition for the release of the diagnosis ensures that the temperature upstream from cooling device 10, which is influenced strongly by the load (i.e., in the case of the diesel engine by the injected quantity, and in the case of the gasoline engine by the air quantity) does not lead to undesirable changes in the temperature downstream from cooling device 10 and from bypass channel 15, which could result in an incorrect diagnosis.

In the case of an error recognition resulting from the described diagnosis, a recognition of the type of error can for example be combined with other diagnoses of the exhaust gas recirculation cooling device. In connection with a diagnosis function described in German Patent Application No. DE 10 2004 041 767 A1, which recognizes a system having an insufficient efficiency of cooling device 10, it is possible to distinguish whether the error lies in a deficient efficiency of cooling device 10 or in an incorrect position of the bypass valve, e.g., a bypass valve that is stuck closed.

According to an alternative specific embodiment, for an operating state of internal combustion engine 1 in which an at least partly opened bypass valve 20 can be assumed, for example in a cold start phase, for the diagnosis it can also be provided that bypass valve 20 not be closed at first, but rather that first temperature value T1 be determined by sampling at first point in time t1 while bypass valve 20 is at least partly open, and that after expiration of first prespecified time span Δt1, second temperature value T2 be determined at second point in time t2 by sampling, and that bypass valve 20 be controlled so as to close at the earliest at second point in time t2, and that after expiration of second prespecified time span Δt2 third temperature value T3 be determined at third point in time t3 by sampling, and that the diagnosis be carried out in the described manner using the three temperature values T1, T2, T3, with corresponding selection, in the described manner, of prespecified time spans Δt1, Δt2, Δt3.

In the alternative specific embodiment, the first temporal temperature gradient is formed, with closed bypass valve 20, from temperature values T2 and T3 and second prespecified time span Δt2, as $$TG1 = \frac{T3 - T2}{\Delta t2},$$

and the second temporal temperature gradient is formed, with opened bypass valve 20, from temperature values T1 and T2 and first prespecified time span Δt1, as $$TG2 = \frac{T2 - T1}{\Delta t1}.$$

The difference Δ between the two temporal temperature gradients is then determined in accordance with equation (3), and the evaluation of the difference Δ takes place in the described manner.

What is claimed is:

1. A method for detecting an error in a mass flow system of an internal combustion engine, the internal combustion engine having at least one mass flow line, a cooling device adapted to cool a mass flow in the mass flow line, a bypass that bypasses the cooling device, and a bypass valve, the mass flow being conducted at least partly through the bypass when the bypass valve is open, and the mass flow being conducted through the cooling device when the bypass valve is closed, the method comprising:

determining a temperature of the mass flow in the mass flow line downstream from the cooling device and from the bypass in the mass flow line;

determining in at least one operating state of the internal combustion engine a first temporal temperature gradient with the bypass valve closed;

determining in the at least one operating state of the internal combustion engine a second temporal temperature gradient with the bypass valve in an open position; and detecting an error as a function of a deviation between the first temporal temperature gradient and the second temporal temperature gradient.

2. The method as recited in claim 1, wherein the error is detected when the first temporal temperature gradient deviates from the second temporal temperature gradient by no more than a prespecified threshold value.

3. The method as recited in claim 1, further comprising:

determining a first temperature at a first point in time with the bypass valve closed or open;

determining a second temperature at a second point in time, subsequent to the first point in time, with the bypass valve closed or open, and simultaneously or subsequently opening or, respectively, closing the bypass valve; and determining a third temperature at a third point in time, subsequent to the second point in time, with the bypass valve opened or closed; and wherein the first temporal temperature gradient is formed as a function of the difference between the first temperature and the second temperature, and the second temporal temperature gradient is formed as a function of the difference between the second temperature and the third temperature.

4. The method as recited in claim 3, wherein the third point in time is selected to be at a temporal interval of at least a second prespecified time span from the time of the opening or closing of the bypass valve.

5. The method as recited in claim 4, wherein the bypass valve is opened or closed within less than a third prespecified time span after the second point in time.

6. The method as recited in claim 5, wherein the temporal interval between the first point in time and the second point in time is selected to be equal to the temporal interval between the second point in time and the third point in time.

7. The method as recited in claim 1, wherein the at least one operating state of the internal combustion engine is selected to be a stationary operating state.

8. The method as recited in claim 7, wherein the stationary operating state is an idling operating state.

9. The method as recited in claim 1, wherein the at least one operating state of the internal combustion engine is present only if a vehicle driven by the internal combustion engine is stationary.

10. The method as recited in claim 9, wherein the at least one operating state of the internal combustion engine is present only if the mass flow or the mass flow rate exceeds a prespecified threshold value.

11. A device for detecting an error in a mass flow system of an internal combustion engine, the internal combustion engine having at least one mass flow line, a cooling device adapted to cool a mass flow in the mass flow line, a bypass that bypasses the cooling device, and a bypass valve, the mass flow being conducted at least partly through the bypass when the bypass valve is open, and the mass flow being conducted through the cooling device when the bypass valve is closed, the device comprising:

a first determining arrangement adapted to determine, downstream from the cooling device and from the bypass in the mass flow line, a temperature of the mass flow in the mass flow line;

a second determining arrangement adapted to determine, in at least one operating state of the internal combustion engine, a first temporal temperature gradient with the bypass valve closed, and to determine, in the at least one operating state of the internal combustion engine, a second temporal temperature gradient with open position of the bypass valve; and a recognition arrangement adapted to recognize an error as a function of a deviation between the first temporal temperature gradient and the second temporal temperature gradient.

* * * * *